US011128612B1

(12) United States Patent
Loladia et al.

(10) Patent No.: US 11,128,612 B1
(45) Date of Patent: *Sep. 21, 2021

(54) ZERO-TOUCH PROVISIONING OF IOT DEVICES WITH MULTI FACTOR AUTHENTICATION

(71) Applicant: Amazon Technologies, Inc., Seattle, WA (US)

(72) Inventors: Rameez Loladia, Seattle, WA (US); Ramkishore Bhattacharyya, Seattle, WA (US); Ashutosh Thakur, Seattle, WA (US); Atulya S. Beheray, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/582,653

(22) Filed: Sep. 25, 2019

Related U.S. Application Data

(63) Continuation of application No. 15/354,869, filed on Nov. 17, 2016, now Pat. No. 10,447,683.

(51) Int. Cl.
*H04L 29/06* (2006.01)

(52) U.S. Cl.
CPC .............................. *H04L 63/0823* (2013.01)

(58) Field of Classification Search
CPC .................................................. H04L 63/0823
See application file for complete search history.

(56) References Cited

U.S. PATENT DOCUMENTS

| 8,392,712 | B1* | 3/2013 | Wilson | H04W 12/06 713/175 |
| 2002/0056747 | A1* | 5/2002 | Matsuyama | G07C 9/23 235/382 |
| 2007/0199053 | A1* | 8/2007 | Sandhu | H04L 9/0825 726/4 |
| 2014/0047510 | A1* | 2/2014 | Belton | H04W 12/0609 726/4 |
| 2015/0046697 | A1* | 2/2015 | Galpin | H04L 63/12 713/155 |
| 2017/0346848 | A1* | 11/2017 | Smith | H04L 63/06 |
| 2018/0091506 | A1* | 3/2018 | Chow | G06Q 20/085 |

* cited by examiner

*Primary Examiner* — Meng Li
(74) *Attorney, Agent, or Firm* — Patterson + Sheridan, LLP

(57) ABSTRACT

Techniques are disclosed for provisioning device-specific credentials to an Internet of Things device that accesses a cloud-based IoT service. The IoT service receives, from the IoT device, a request for device-specific credentials. The request comprises a provisioning certificate including information identifying a group of devices associated with the IoT device. The provisioning certificate is authenticated by evaluating the information with expected information. The device-specific credentials are generated based, at least in part, on the information provided in the provisioning certificate. The device-specific credentials are sent to the IoT device, and the IoT device installs and activates the device-specific credentials. The device-specific credentials are associated with the IoT device in a registry of the IoT service.

20 Claims, 8 Drawing Sheets

ZERO-TOUCH PROVISIONING OF IOT DEVICES WITH MULTI FACTOR AUTHENTICATION

CROSS-REFERENCE TO RELATED APPLICATION

This application is a continuation of co-pending U.S. patent application Ser. No. 15/354,869, filed Nov. 17, 2016. The aforementioned related patent application is herein incorporated by reference in its entirety.

BACKGROUND

Embodiments presented herein generally relate to Internet of Things (IoT). More specifically, embodiments presented herein provide techniques for provisioning credentials on an IoT device via a cloud computing platform.

Internet of Things (IoT) is an approach for networking physical objects that are embedded with electronics, software, sensors, and the like that enables these objects to collect and exchange data. For instance, common household appliances may implement IoT technology to improve lifestyles of individuals. As an example, an IoT-based thermostat can collect data relating to the schedule of and usage by an individual to automatically program itself. As another example, door locks may be outfitted with IoT technology to detect a wireless signal, compare the signal with a wireless fingerprint, and unlock a door based on the comparison.

IoT devices are typically networked via a hub that allows messages to be sent back and forth between the hub and devices. Such messages can include data received by a device, executable code to be performed by the device, data being sent from the device to another device, and the like. Although the hub can be a physical networking device, cloud computing platforms can provide a hub service for connecting IoT devices, allowing the devices to connect directly to the cloud and use other services provided by the cloud computing platform, such as storage and data stream processing. Indeed, many IoT devices are manufactured to support cloud-based IoT hub subsystems.

One issue regarding manufacturing IoT devices to support the cloud relates to provisioning a fleet of homogenous devices with distinct credentials used to uniquely identify each device in the group. Typically, each device in the group is manufactured and shipped with a common device image. But before a given device can be used, the device must be provisioned with credentials and other identifying information. Doing so often requires a number of steps, such as generating a digital certificate signing request (CSR), sending the CSR to a certificate authority (CA), obtaining and activating the digital certificate, setting up device permissions, and the like. Consequently, it is impractical to provision distinct credentials to each individual device at the manufacturing level, given the large amount of IoT devices being manufactured in batches. As a result, provisioning a device typically occurs at the user level. However, given the complexity of the provisioning process, user-level provisioning is susceptible to errors.

BRIEF DESCRIPTION OF DRAWINGS

Various embodiments in accordance with the present disclosure will be described with reference to the drawings, in which.

DETAILED DESCRIPTION

Figure 1:
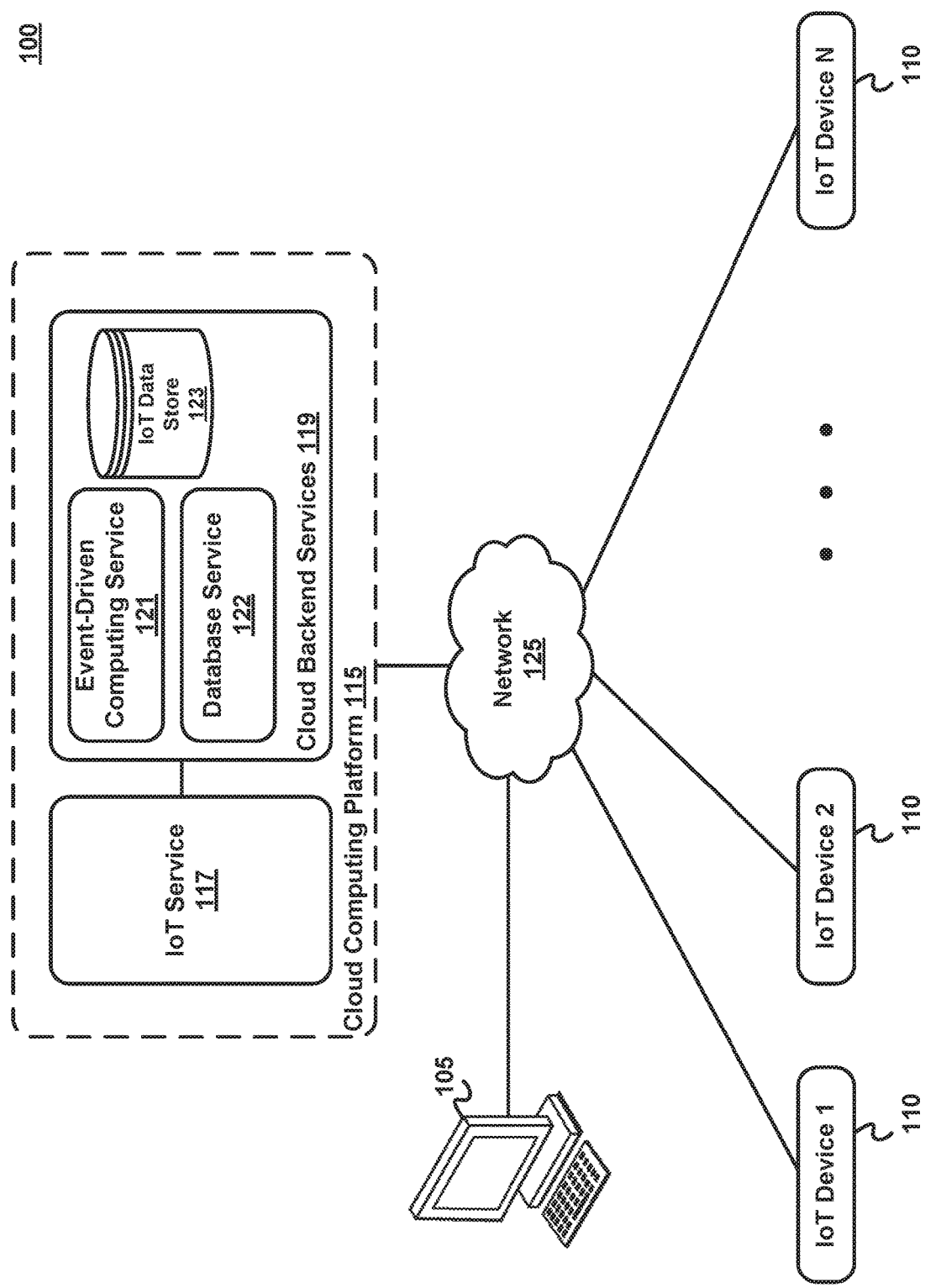
FIG. 1 illustrates an example computing environment including a cloud computing platform hosting an Internet of Things (IoT) service used to provision IoT devices with device-specific credentials, according to one embodiment.

Generally, an Internet of Things (IoT) device that supports cloud-based hub subsystems need to be provisioned with distinct credentials that allows the hub to uniquely identify the device. This process can include generating a key pair for a digital certificate, generating a certificate signing request (CSR) based on the key pair and specified attributes, and sending the CSR to a certificate authority (CA). In turn, the CA generates the digital certificate and issues the digital certificate to the device. The device must then install and activate the digital certificate. Further, device permissions must also be configured. Conducting this process at the manufacturing level is impractical due to the volume of devices being manufactured at a time.

Embodiments presented herein disclose techniques for provisioning an IoT device with device-specific credentials. In particular, techniques provide a zero-touch approach to provisioning the IoT device at initial startup of the device. In one embodiment, the IoT device is configured with a certificate (referred to hereafter as a "provisioning certificate") that is associated with a particular group of devices. For example, the group of devices may correspond to identical devices that are manufactured in a given batch. The provisioning certificate may include information uniquely identifying the group associated with the devices, such as an ID number associated with the device group, manufacturer ID, and the like. Further, the provisioning certificate and metadata associated with the provisioning certificate (e.g., a number of devices associated with the provisioning certificate, a manufacturing date, etc.) may be registered with a cloud-based IoT service. While the provisioning certificate may be distinct to the device group as a whole, the certificate is generic with respect to individual devices of the group.

In one embodiment, at initial startup of the IoT device, the IoT device may connect to the IoT service. Once connected, the IoT device may have limited access to cloud services due to lack of credentials. The IoT device may send a self-provisioning request to the IoT service. Such a request includes the provisioning certificate associated with the IoT device as well as some other information associated with the device that may be used as additional factors for multi-factor authentication (MFA), such as a hardware ID or media access control (MAC) address. In response, the IoT service authenticates the request using the information provided with the request. For example, the IoT service may verify the integrity of the data contained in the provisioning certificate relative to the IoT device.

In addition, a user of the cloud computing platform (e.g., a manufacturer, vendor, or developer affiliated with the device) may define an authentication workflow prior to initially starting up the IoT device. As a result, the IoT service may initiate the user-defined authentication workflow as part of the initial authentication of the device. For example, the workflow may direct the IoT service to verify the hardware ID of the IoT device relative to the provisioning certificate to ensure that the hardware ID corresponds to a device that is associated with the provisioning certificate.

Once authenticated, the IoT service may initiate a user-defined provisioning workflow to install and activate credentials distinct to the IoT device, such as an X.509 digital certificate that may be required by the cloud computing platform. For example, the workflow may trigger the IoT service to prompt the IoT device to generate and send a CSR to a CA associated with the IoT service. The CA may generate a digital certificate from the CSR and issue the digital certificate to the IoT device. In turn, the IoT device may install and activate the digital certificate. As another example, the user-defined provisioning workflow may direct the IoT service to obtain a previously generated digital certificate from the IoT device, validate the digital certificate, and associate the digital certificate with the IoT device on the IoT service.

As yet another example, the user-defined provisioning workflow may direct the IoT service to obtain a device profile from an account of the user on the cloud computing platform. The IoT service may identify attributes from the device profile, such as version requirements, device permissions, logging parameters, and the like. Once identified, the IoT service can translate the attributes to variables for generating an IoT policy to attach to a digital certificate either generated for or registered with the IoT service.

Advantageously, this approach automatically provisions unique identifying credentials to an IoT device with minimal interaction by an owner of the device. The provisioning certificate provides enough information for a cloud-based IoT service to trigger workflows for authenticating and provisioning device-specific credentials to the IoT device. Doing so addresses the concerns at the manufacturer level regarding provisioning distinct credentials to individual devices being manufactured as part of a large batch. That is, the manufacturer can store a provisioning certificate that serves as a common credential shared by the devices in the device group. The manufacturer can then register the provisioning certificate and other information with the IoT service on the cloud platform. Further, this approach provides a relatively secure method of authenticating and provisioning IoT devices. For example, if the provisioning certificate is compromised, the IoT service can remove association of and/or revoke a digital certificate issued based at least in part on the provisioning certificate. Additionally, a manufacturer can optionally pre-generate digital certificates and register the certificates with the IoT service for exchange with a provisioning certificate. The IoT service may then vend the registered certificate with a given IoT device after authentication. Advantageously, this prevents the IoT service from vending more digital certificates than are registered by the manufacturer.

Note, the following uses, as a reference example, a provisioning certificate that is shared among identical devices in a device group (e.g., as part of a manufacturing batch of the devices). However, one of skill in the art will recognize that provisioning certificates may be distributed to IoT devices based on other groupings. For example, a provisioning certificate may be assigned to IoT devices of heterogeneous types under a common manufacturer. As another example, a provisioning certificate may be assigned to IoT devices of a given user (e.g., a large enterprise). In such cases, the manufacturer might rotate provisioning certificates among relatively smaller batches of the heterogeneous devices over specified periods to preserve security.

FIG. 1 illustrates an example of a computing environment 100 including a cloud computing platform hosting an Internet of Things (IoT) service used to provision IoT devices with device-specific credentials, according to one embodiment. As shown, the computing environment 100 includes a management console 105, one or more IoT devices 110, a cloud computing platform 115, each interconnected via a network 125 (e.g., the Internet).

In one embodiment, the management console 105 is a physical computing system (e.g., a desktop computer, laptop computer, or mobile device) or a virtual computing instance executing in the cloud (e.g., as part of the cloud computing platform 115). The management console 105 provides an interface application that allows a user to access services provided by the cloud computing platform 115 via an account associated with the user. For example, the management console 105 may provide a graphical user interface through which a user can modify a configuration associated with the account.

In context of the present disclosure, a user may maintain a number of IoT devices 1-N 110 (e.g., as a manufacturer of the devices, developer, vendor, etc.). Each IoT device 110 generally represents some physical object that is configured to communicate with other entities (e.g., the management console 105, the cloud computing platform 115, and other IoT devices 110) in addition to performing some underlying function associated with the IoT device 110 itself. For example, the IoT device 110 can represent a household appliance or device configured with IoT technology, such as a smart lightbulb or a smart thermostat. The IoT device 110 may communicate to other entities using a messaging protocol, such as Message Queuing Telemetry Transport (MQTT), which is a publish-subscribe messaging scheme that allows lightweight messaging between entities.

In one embodiment, the IoT devices 110 support interconnectivity with a cloud computing environment, such as the cloud computing platform 115. Generally, the cloud computing platform 115 comprises a number of cloud computing services to provide a large computing capacity to a user base. As shown, the cloud computing platform 115 includes an IoT service 117 and cloud backend services 119, which include an event-driven computing service 121, a database service 122, and an IoT data store 123. Of course, the services presented herein are merely provided to illustrate the present disclosure. The cloud computing platform 115 may provide a number of additional services not depicted in FIG. 1.

The IoT service 117 is a managed platform that allows connected IoT devices (e.g., IoT devices 110) to interact with the services provided by the cloud computing platform 115 (in addition to other entities). For example, the event-driven computing service 121 invokes predefined functions in response to some triggering event. For instance, a manufacturer of the IoT device can write a function that the event-driven computing service 121 can invoke, for instance, when a given IoT device 110 requests data in a lookup table maintained by the database service 122. Similarly, the manufacturer of the IoT device 110 may write a function that the event-driven computing service 121 invokes when an IoT device 110 sends analytical data to be stored in the IoT data store 123. An example of an event-driven computing service 121 includes the AWS Lambda service, which provides a serverless compute service that runs application code—functions—in response to events and automatically manage underlying compute resources used to execute the application code.

Further, the IoT service 117 allows the IoT devices 110 to connect and communicate with the services in a secure manner. For example, the IoT service 117 may provide a secure communications protocol, such as transport layer security (TLS), for communications between devices. In addition, prior to a given IoT device 110 permitted to access cloud services, the IoT service 117 may initially authenticate the IoT device 110 during an attempted connection to the IoT service 117. The authentication process may include obtaining a digital certificate (e.g., an X.509 certificate) and/or other identifying information from the IoT device 110. The IoT service 117 may verify the digital certificate and other information to ensure, e.g., that the information is associated with the actual device, the information is valid, and the like.

Generally, when IoT-enabled devices (such as IoT devices 110) are manufactured, the devices are configured using an identical device image that provides a predefined configuration for the devices. Thus, a given IoT device might not have unique identifying information by default. Consequently, a user might have to manually configure the IoT device with such information before being able to use services of the cloud computing platform 115.

Figure 2:
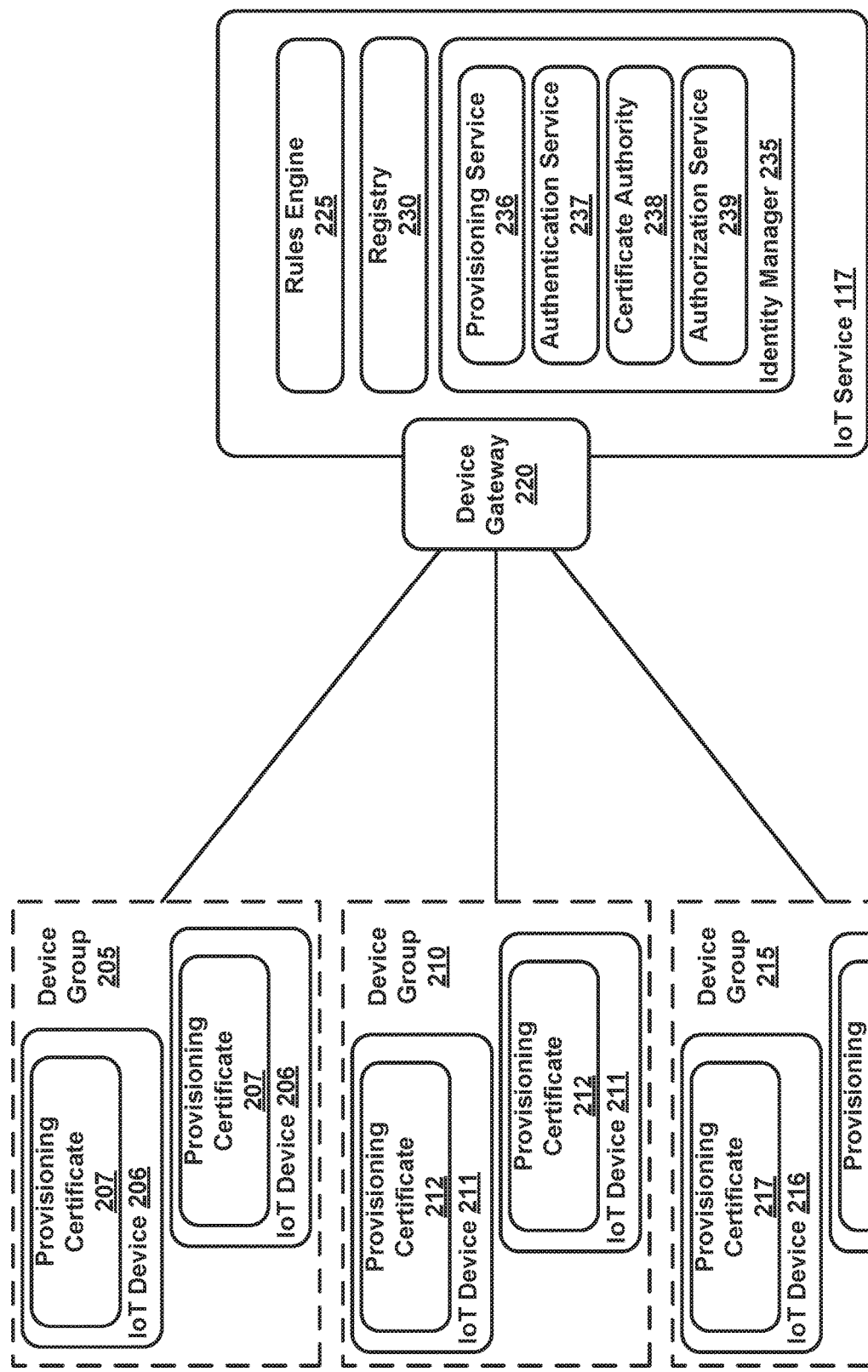
FIG. 2 illustrates a conceptual diagram of IoT device groups communicating with an IoT service provided on a cloud computing platform to provision device-specific credentials, according to one embodiment.

As noted above, a given IoT device may be configured with a common provisioning certificate that is shared across identical devices, e.g., manufactured as part of a large group of devices. The provisioning certificate provides information that is previously registered with the cloud computing platform 115 and therefore recognizable when presented with the provisioning certificate. FIG. 2 illustrates a conceptual diagram of IoT device groups communicating with the IoT service 117, according to one embodiment. In particular, FIG. 2 further illustrates components of the IoT service 117 used to provision device-specific credentials to IoT devices of a user of the cloud computing platform 115.

Illustratively, FIG. 2 depicts three device groups 205, 210, and 215. Each device group may correspond to identical types of devices maintained by the user. For example, devices belonging to the device group 205 may correspond to smart lightbulbs, device group 210 to IoT security cameras, and device group 215 to pet feeders. Device group 205 includes IoT devices 206, device group 210 includes IoT devices 212, and device group 215 includes IoT devices 216. Further, each of the devices stores a provisioning certificate that is distinct to the respective device group. For example, each of the IoT devices 206 stores a provisioning certificate 207, each of the IoT devices 211 stores a provisioning certificate 212, and each of the IoT devices 216 stores a provisioning certificate 217.

As shown, the IoT service 117 includes a device gateway 220, a rules engine 225, a registry 230, and an identity manager 235. The identity manager 235 includes a provisioning service 236, an authentication service 237, a certificate authority (CA) 238, and an authorization service 239. One of skill in the art will recognize that the actual allocation of tasks performed by each of the components in the IoT service 117 may vary substantially from this illustration.

The device gateway 220 enables the IoT devices to communicate with the services of the cloud computing platform 115. In one embodiment, the device gateway 220 may be associated with a message broker uses the MQTT protocol for communication, which is generally a publish-subscribe model that enables one-to-one and one-to-many communications with devices. In particular, MQTT provides various channels for communication (also referred to herein as "topics"). The message broker uses topics to route messages from a publishing client to a subscribing client. Further, the message broker may ensure secure communication using a secure protocol, such as TLS or secure socket layer (SSL). Of course, the device gateway 220 may support other protocols for communication between IoT devices, such as WebSockets and HTTP 1.1.

The rules engine 225 evaluates inbound messages published to the IoT service 117. Based on the evaluation, the rules engine 225 transforms and delivers the messages to a given device (or service) based on a specified rule (e.g., defined via the user interface provided by the management console 110). Further, the rules engine 225 routes messages to various endpoint services of the cloud computing platform 115, such as the event-driven computing service 121, database service 122, and storage services (e.g., to store data to the IoT data store 123). For example, a rule can define certain conditions relating to a given IoT device (or gathered by the IoT device) and trigger a message to be sent to the event-driven computing service 121, directing the event-driven computing service 121 to invoke a function to perform some action in response resulting from the condition.

The registry 230 establishes identities for registered IoT devices and tracks metadata (e.g., attributes and capabilities of each IoT device). When registering an IoT device with a particular user account, the registry 230 assigns an identifier to the device. Other services in the cloud computing platform 115 may perform lookups in the registry to identify IoT devices associated with a given user account.

In one embodiment, the authorization service 239 establishes a chain of authenticity for a given user that will generate provisioning certificates for storing on IoT devices. For instance, a user may send a request to the authorization service 239 to register a provisioning certificate previously generated by the user (e.g., via a third party CA). To do so, the user, via the management console 105, may invoke an application programming interface (API) provided by the graphical user interface for registering with the IoT service 117. The request can include the provisioning certificate and credentials, such as a user and password combination associated with the user account, device type information, and permissions to be associated with the IoT device. In turn, the authorization service 239 may validate the credentials, such as by verifying key pair information provided in the request. Once validated, the authorization service 239 may register the provisioning certificate associated with the device group (e.g., by storing the provisioning certificate in a location of the IoT data store 123 associated with the user account). Further, the authorization service 239 may store the specified permissions in a device profile maintained on the IoT data store 123.

In some cases, the IoT service 117 itself may generate a provisioning certificate for a particular device (e.g., via the CA 238). In such a case, the user requests a provisioning certificate from the authorization service 239. The request can include credentials, device type information, permissions to be associated with the IoT device on the service, and a CSR for the provisioning certificate. The authorization service 239 may validate the credentials, and once validated, the authorization service 239 may forward the CSR to the CA 238, which in turn generates the provisioning certificate. The authorization service 239 may register the provisioning certificate with the user on the IoT service 117 and store the provisioning certificate on the IoT data store 123. Further, the CA 238 may send the provisioning certificate to the user, which allows the user to store the generated provisioning certificate on associated IoT devices of a given device group.

In one embodiment, the provisioning service 236 provides a topic that an IoT device may subscribe to when being initially set up. That is, the IoT device may be preconfigured to initially attempt connecting to the provisioning service 236 using a specified provisioning topic. Further, the provisioning service 236 is configured to accept subscription requests at that provisioning topic by IoT devices. Once connected, the provisioning service 236 may receive a self-provisioning request from the IoT device for a digital certificate specific to the IoT device. In one embodiment, the request includes the provisioning certificate of the IoT device as part of the payload. The provisioning service 236 may relay the self-provisioning request to the authentication service 237.

The authentication service 237 evaluates authentication and provisioning requests by IoT devices. The authentication service 237 may use a variety of authentication techniques to ensure that credentials associated with an IoT device are valid.

In the event that the authentication service 237 processes a self-provisioning request by a new IoT device, the authentication service 237 may verify the identity of the IoT device, in part, via information provided by the provisioning certificate. For instance, the authentication service 237 may evaluate the provisioning certificate to confirm that the provisioning certificate is valid. To do so, the authentication service 237 may evaluate the provisioning certificate against a database of provisioning certificates registered by a manufacturer of the IoT device. More specifically, the manufacturer may register a specified amount of provisioning certificates and notify the IoT service 117 of the amount for that device group. The provisioning certificate may provide identifying information to the authentication service 237 that indicates an associated device group (such as a group or type ID that is recognizable by the IoT service 117).

In addition, the authentication service 237 may also evaluate other information provided with the self-provisioning request. For example, the manufacturer, in addition to registering the provisioning certificates, may also register a range of hardware device identifiers of the device with the IoT service. Under this approach, the IoT device may include its hardware device identifier with the self-provisioning request. The authentication service 237 may evaluate the hardware device identifier to determine whether the identifier belongs to the range of identifiers associated with the provisioning certificate.

Further, the provisioning service 236 is configured to receive an indication from the authentication service 237 that the IoT device was successfully authenticated. In response, the provisioning service 236 may initiate a user-defined authentication workflow to provide an additional layer of security in authenticating the device. To initiate the workflow, the event-driven computing service 121 may have a function for determining whether a user-defined workflow exists, retrieving the workflow from the user account if so, and executing the workflow. The provisioning service 236 receiving an indication of the successful authentication may trigger the event-driven computing service 121 to invoke the function.

The user-defined authentication workflow includes additional steps for authentication, such as evaluating the request for other identifying information provided in the request payload, such as a data source name (DSN) of the IoT device, Enhanced Privacy ID (EPID) signature, media access control (MAC) address, and the like. Advantageously, triggering the execution of the user-defined authentication workflow provides multi-factor authentication for the IoT device.

In one embodiment, the provisioning service 236 then prepares the IoT device for use (or updates the device for use) based on the information provided by the self-provisioning request. The provisioning service 236 may identify, based on the device group identified in the provisioning certificate, whether the IoT device is associated with a device profile associated with the account of the user. Generally, the cloud computing platform 115 may allow a user (e.g., via the management console 110) to specify a profile for a given device type. The profile may include a variety of attributes, such as permissions to set on a device of that type, connection settings, etc. The provisioning service 236 may trigger a function to be invoked by the event-driven computing service 121 that determines whether a device profile for the device type is associated with the user account and, if so, and retrieves the profile. The provisioning service 236 may translate the attributes of the device profile into corresponding variables to be used in generating an IoT policy for the IoT device. Further, the provisioning service 236 may send the request including the generated policy to the certificate authority 238.

The CA 238 is configured to generate, from a CSR, a trusted certificate (e.g., a X.509 digital certificate). The CA 238 confirms that the information provided in the CSR (e.g., public key information) is valid. The CA 238 may issue a generated digital certificate to the requesting IoT device. Further, doing so may trigger a function to be invoked (e.g., via the event-driven computing service 121) that causes the provisioning service 236 to associate the digital certificate with the IoT device on the cloud computing platform 115, e.g., on the registry 230.

Figure 3:
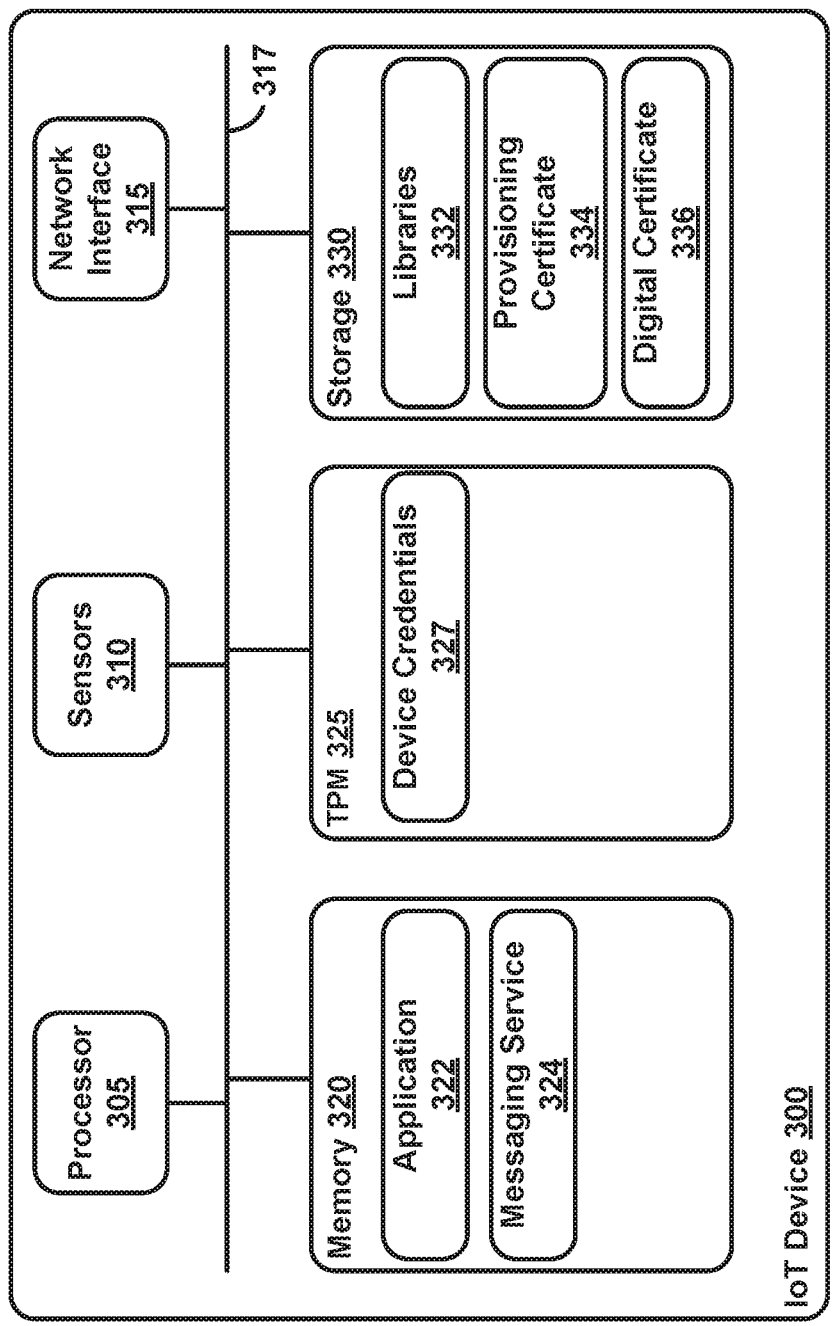
FIG. 3 illustrates an example IoT device configured with a provisioning certificate associated with a device group, according to one embodiment.

FIG. 3 illustrates an example IoT device 300 configured with a provisioning certificate associated with a device group, according to one embodiment. As shown, the IoT device 300 includes, without limitation, a processor 305, sensors 310, a network interface 315, a memory 320, a trusted platform module (TPM) 325, and a storage 330, each interconnected via a bus 317. Of course, an actual IoT device will include a variety of additional hardware components.

The processor 305 retrieves and executes programming instructions stored in the memory 320. Similarly, the processor 305 stores and retrieves application data residing in the memory 320. The bus 317 is used to transmit instructions and data between the processor 305, sensors 310, network interface 315, memory 320, and the storage 330. The processor 305 is included to be representative of a single CPU, multiple CPUs, a single CPU having multiple processing cores, and the like. The memory 320 is generally included to be representative of memory and storage on the IoT device 300.

Illustratively, the memory 320 includes an application 322 and a messaging service 324. The TPM 325 includes device credentials 326. The storage 330 includes libraries 332, a provisioning certificate 334, and a digital certificate 336. In one embodiment, the application 322 may direct the sensors 310 to collect predetermined types of data. The application 322 may use libraries 332 to carry out functionalities generally provided by the IoT device 300. Further, the messaging service 324 generates, formats, and sends messages to destination devices or services. The messaging service 324 may support a variety of communication protocols, such as MQTT to send the messages via a publish-subscribe model. The TPM 325 is a secure cryptographic processor that integrates the device credentials 326 into the IoT device 300. Further, the trusted platform module provides remote attestation capability by generating an endorsement key (EK) pair. A private key of the EK pair is permanently embedded in tamper-proof hardware of the TPM 325. Device credentials 326 may include the EK pair as well as information used to identify the device, such as a hardware device identifier, MAC address, and the like.

The provisioning certificate 334 is installed into the IoT device 300 at manufacture of the device with other IoT devices identical to the device 300. The provisioning certificate 334 includes information associated with the group of manufactured devices, such as a device group ID, manufacturer ID, device type ID, manufacture date, and the like. The manufacturer may specify an amount of devices to provision with a given provisioning certificate such that the provisioning certificate assigned to a given batch of devices manufactured on the same day differs from the provisioning certificates assigned to another batch of identical devices, e.g., to limit a blast radius of affected devices in the event the provisioning certificate is compromised (e.g., if the provisioning certificate is spoofed). At initialization of the IoT device 300, the IoT device 300 may include the provisioning certificate 334 as part of a message corresponding to a self-provisioning request to be sent to the IoT service 117 (via the messaging service 324). Once a digital certificate is obtained from the CA 238, the IoT device 300 may delete the provisioning certificate 334 from the storage 330.

In some cases, the manufacturer may independently obtain a digital certificate 336 from a CA that is different from the CA 238 and store the digital certificate in the storage 330 prior to deployment. In other cases, a user may install a digital certificate independently obtained apart from the CA 238. In such cases, the provisioning workflow may include steps for registering the digital certificate 336 with the IoT service 117. For example, the provisioning workflow may first determine whether the IoT device 300 currently stores a digital certificate. And if so, then the authentication service 237 may validate the digital certificate 336, and upon successful validation, the provisioning service 236 may associate the digital certificate 336 with the IoT device 300 in the registry 230.

Figure 4:
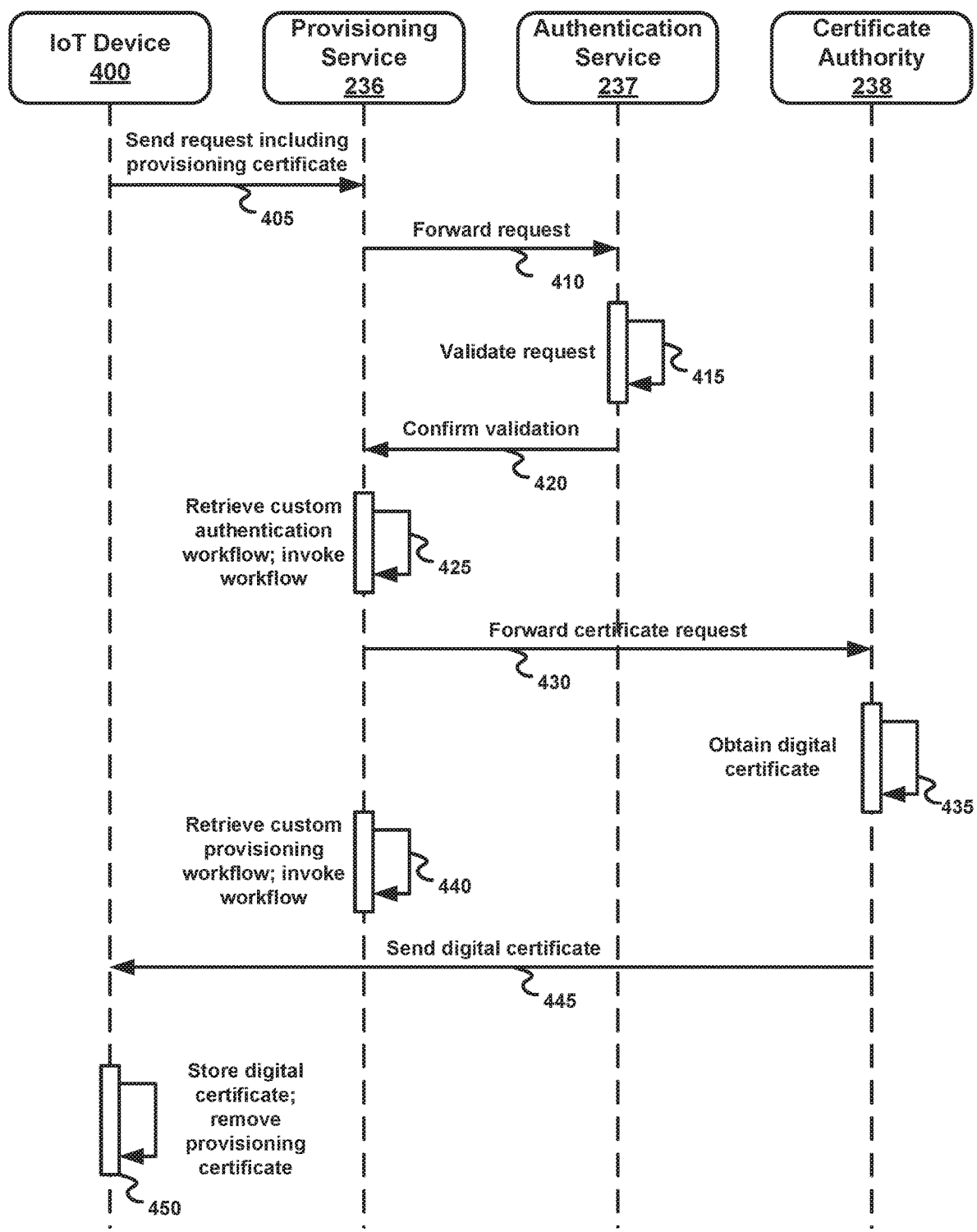
FIG. 4 illustrates an example sequence for provisioning an IoT device with device-specific credentials using a provisioning certificate associated with a given device group, according to one embodiment.

FIG. 4 illustrates an example sequence for provisioning an IoT device 400 with device-specific credentials using a provisioning certificate associated with a given device group, according to one embodiment. In this example, assume that the IoT device 400 is initially powered on and possesses no digital certificate. At initial startup, the IoT device 400 connects to the IoT service 117 via the network 125.

At 405, the IoT device 400 sends a self-provisioning request to the provisioning service 236. The request may correspond to a MQTT subscription to a provisioning topic provided by the provisioning service 236. The request may include, as part of the payload, includes the provisioning certificate stored on the IoT device 400. The request may also include other data, such as a hardware device identifier, a geolocation of the device, user account credentials, and the like. At 410, the provisioning service forwards the request to the authentication service 237.

At 415, the authentication service 237 validates the request based on an evaluation of the provisioning certificate. As stated, the provisioning certificate is previously registered with the IoT service 117. The authentication service 237 may evaluate the provisioning certificate against a registry of provisioning certificates to ensure that the provisioning certificate has not been previously invalidated, corresponds to a valid provisioning certificate in the registry, etc. At step 420, the authentication service 237 sends a confirmation of the validation to the provisioning service 236.

In response, the provisioning service 236 may invoke the user-defined authentication workflow. In this example, at 425, the provisioning service 236 retrieves the authentication workflow and invokes the workflow (e.g., via a function triggered by the event-driven computing service 121). Example steps in the workflow include performing multi-factor authentication of the IoT device 400 based on the provisioning certificate and additional credentials provided with the self-provisioning request. At 430, the provisioning service 236 forwards the self-provisioning request to the CA 238. At 435, the CA 238 obtains a X.509 digital certificate for the IoT device 400. For instance, the CA 238 may generate the digital certificate from a CSR provided with the self-provisioning request. In other cases, the CA 238 may retrieve a stored digital certificate to be vended in exchange for the provisioning certificate. At 440, the provisioning service retrieves a user-defined provisioning workflow and invokes the workflow to asynchronously provision the IoT device 400 on the server-side. Example steps of the workflow include modifying a status field for the digital certificate as active, associating the digital certificate with the IoT device 400 in the registry 230, and the like. At 445, the CA 238 sends the digital certificate to the IoT device 400. At 450, the IoT device 400 stores the digital certificate. Further, the IoT device 400 may install the stored digital certificate, disconnect from the IoT service 117, and perform a self-restart of the IoT device 400 to activate the digital certificate. Once restarted, the IoT device 400 removes the provisioning certificate from storage. The IoT device 400 may then reconnect to the IoT service 117 to use permitted services of the cloud computing platform 115.

Figure 5:
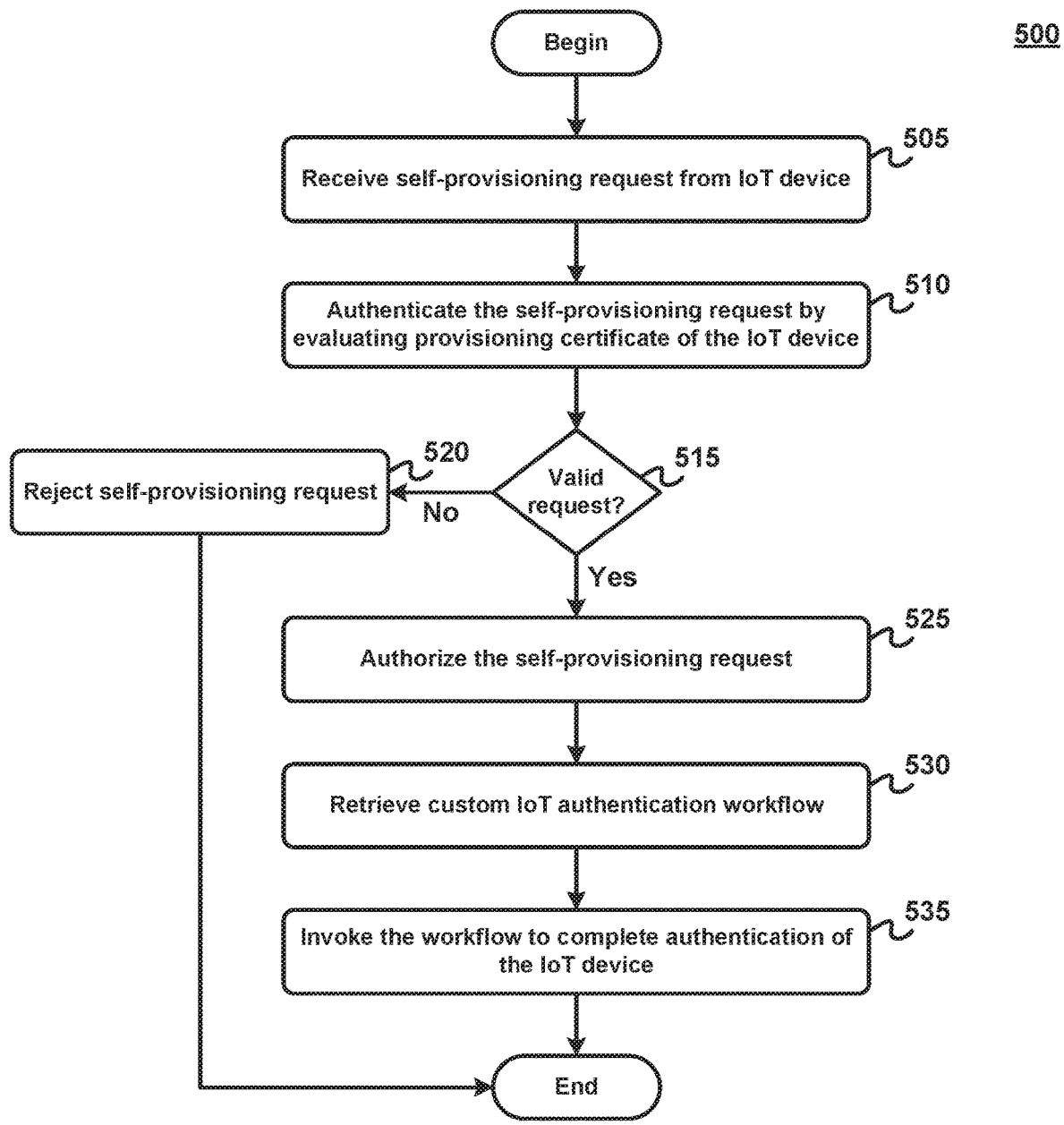
FIG. 5 illustrates a method for authenticating an IoT device with a cloud computing platform using a provisioning certificate associated with a device group, according to one embodiment.

FIG. 5 illustrates a method 500 for authenticating an IoT device with a cloud computing platform using a provisioning certificate associated with a device group, according to one embodiment. In particular, method 500 is from the perspective of various components of the IoT service 117 in the event that an IoT device that is yet to be provisioned connects to the IoT service 117.

As shown, the method 500 begins at step 505, where the provisioning service 236 receives a self-provisioning request from the IoT device. The self-provisioning request may be sent via a topic channel provided by the provisioning service 236. The request payload may include a provisioning certificate of the IoT device and additional information used to identify the device. For example, addition information can include a security token, credentials associated with the user account of the IoT service, a hardware device identifier, a MAC address of the IoT device, and the like.

At step 510, the authentication service 237 authenticates the self-provisioning request. As stated, the authentication service 237 may evaluate the provisioning certificate against a listing of provisioning certificates registered with the IoT service 117 by one or more manufacturers. For example, the authentication service 237 may determine that the provisioning certificate is valid based on a lookup of a manufacturer ID and the device group ID. The authentication service 237 may also evaluate a count of provisioning certificates from the device group that have already been claimed (to ensure that more the count does not exceed the number of total available provisioning certificates registered to the device group).

At step 515, the authentication device 236 determines whether the self-provisioning request corresponds to a valid request based on the provisioning certificate information. If not (e.g., if the provisioning certificate count is exceeded, the request is malformed, the provisioning certificate does not match any information registered with the IoT service 117, etc.), then the authentication device 236 rejects the self-provisioning request. The provisioning service 117 may return an error to the IoT device as a result.

Otherwise, if the request is valid, the authentication service 237 authorizes the self-provisioning request. Doing so may trigger an event in the event-driven computing service 121 for invoking a function to perform a user-defined IoT authentication workflow. At step 530, the provisioning service 236, via the event-driven computing service 121, retrieves a user-defined IoT authentication workflow associated with the user account. To do so, the event-driven computing service 121 may use credentials associated with the user to access the user account, determine whether the user-defined authentication workflow is present, and then retrieve the user defined authentication workflow if so. At step 535, the provisioning service 236 invokes the authentication workflow (e.g., via the function invoked by the event-driven computing service 121). Of course, other techniques may be used to retrieve and invoke the user-defined IoT authentication workflow. For instance, the provisioning service 237 may be configured to access an automated script from a location in the IoT data store 123. The automated script may include commands that, when performed, retrieves the authentication workflow associated with the user and invokes the workflow.

The authentication workflow may direct the IoT device, provisioning service 236, and authentication service 237 to perform additional process steps to further authenticate the IoT device. For example, the workflow may include steps for evaluating additional identifying information provided with the self-provisioning request, such as a hardware device ID, geolocation information, user account credentials, and the like. The workflow can also include steps for prompting the IoT device to send additional identifying information to the authentication service 237. The authentication service 238 may conduct multi-factor authentication based on the provided identifying information. Other steps may include sending a notification to the IoT device that the authentication is successful.

Once authenticated, the provisioning service 237 may retrieve a user-defined provisioning workflow to complete provisioning of the IoT device on the IoT service 117. For example, the provisioning service 237 may trigger a function (e.g., an AWS Lambda function) via the event-driven computing service 121 to retrieve and invoke the provisioning workflow.

Figure 6:
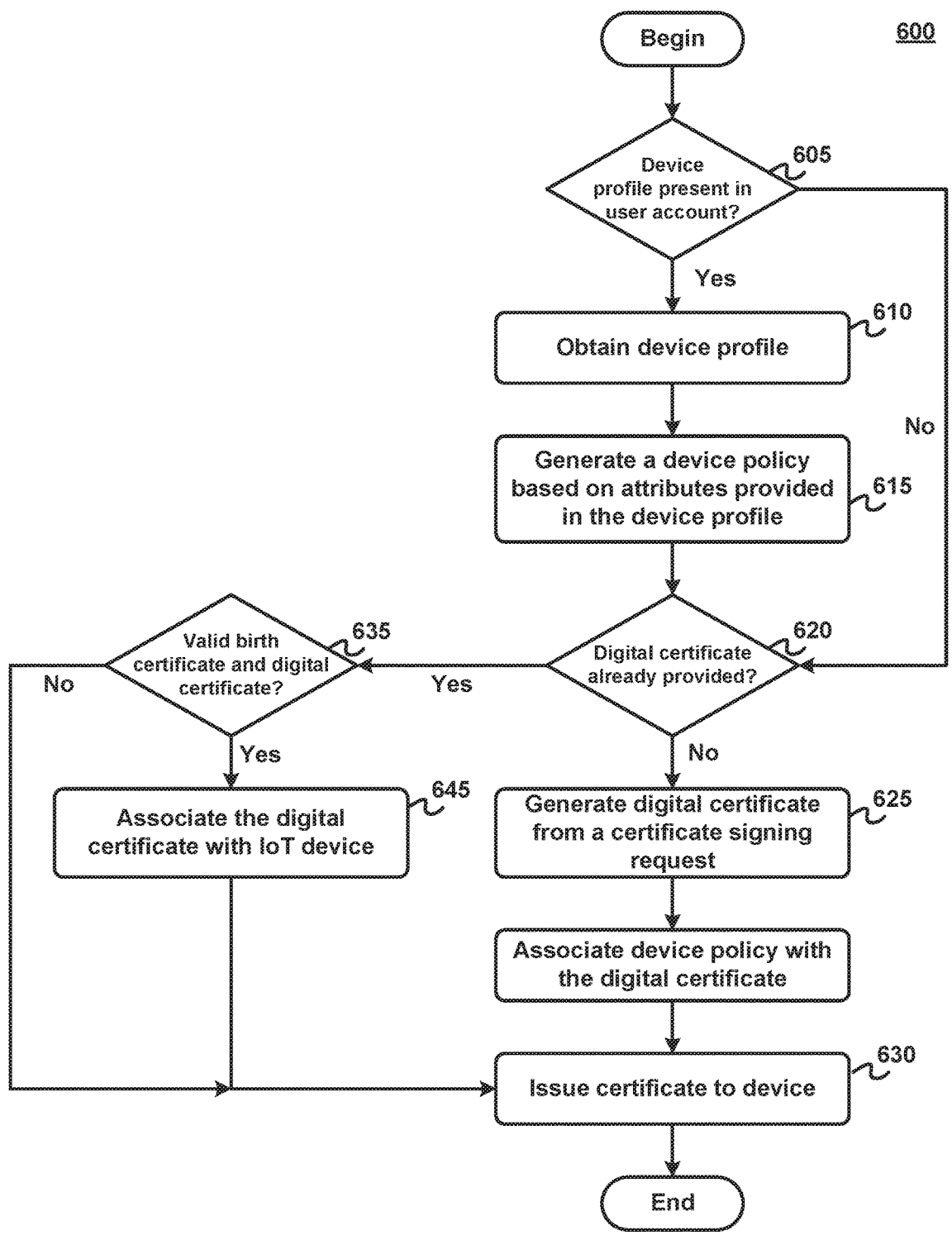
FIG. 6 further illustrates a method for provisioning an IoT device with device-specific credentials, according to one embodiment.

FIG. 6 further illustrates a method 600 for provisioning an IoT device with device-specific credentials, according to one embodiment. In particular, method 600 occurs after the authentication service 237 authenticates the self-provisioning request of the IoT device. Once authenticated, the provisioning service 236 initiates a provisioning workflow for generating (or registering) device-specific credentials for the IoT device.

As shown, the method 600 begins at step 605, where the provisioning service 236 determines whether a device profile is present in a user account associated with a type of the IoT device. To do so, the provisioning service 236 may access the user account via a function invoked by the event-driven computing service 121. The function may include steps for determining the account of the user activating the device, obtaining credentials of the user, signing into the user account, and evaluating device profiles associated with the user account. If a device profile is not available, the method 600 proceeds to provisioning or registering a digital certificate for the IoT device (at step 620).

Otherwise, if a device profile associated with the type of the IoT device is available, then, at step 610, the provisioning service 236 (e.g., via the event-driven computing service function) obtains the device profile for the IoT device type. The provisioning service 236 may identify attributes provided in the device profile. Such attributes can include device and user permissions, domain name information, network configurations, and other metadata.

At step 615, the provisioning service 236 generates a policy for the IoT device based on the attributes provided in the device profile. To do so, the provisioning service 236 may retrieving a mapping table maintained in the IoT data store 123 of attributes to policy variables. The provisioning service 236 may then determine the mapping from specified attributes to the policy variables and propagate fields of a policy template (which may also be maintained in the IoT data store 123) with the specified attributes based on the mappings. The provisioning service 236 can associate the generated policy with a CSR for a digital certificate (e.g., provided by the IoT device) or with a digital certificate provided by the IoT device (in the event, for example, that a manufacturer has preloaded the IoT device with a digital certificate).

At step 620, the provisioning service 236 determines whether a digital certificate is already provided for the IoT device. As stated, a manufacturer may preload the IoT device with its own digital certificate. As another example, the CA 238 may pre-generate a digital certificate for a particular group of IoT devices. That is, when the manufacturer registers a set of provisioning certificates with the IoT service 117, the manufacturer may also request that the CA 238 pre-generate a digital certificate for each corresponding provisioning certificate. Doing so allows the CA 238 to vend a digital certificate for every claimed provisioning certificate in the device group. This approach provides a measure of security to prevent more IoT devices than expected from requesting self-provisioning based on a given provisioning certificate.

In the event that a digital certificate is already provided (e.g., if pre-generated by a third-party CA or pre-generated by the CA 238), then at step 635, the provisioning service 236 ensures that the underlying provisioning certificate and digital certificate are valid. For example, if the digital certificate is pre-generated by the CA 238, the provisioning service 236 may evaluate a count of issued digital certificates for the provisioning certificate to ensure that the count does not exceed the total amount of pre-generated digital certificates. If the digital certificate is pre-generated by a third-party, e.g., on behalf of the manufacturer, the provisioning service 236 may direct the authentication service 237 to determine the validity of the digital certificate. For example, the authentication service 237 may authenticate the credentials of the third-party CA, generate an Online Certificate Status Protocol (OCSP) request including the digital certificate, and send the OCSP request to an OCSP responder associated with the third-party CA. In turn, the OCSP responder may send an OCSP response indicating the validity of the digital certificate. The authentication service 237 may return the OSCP response to the provisioning service 236. As another example, the authentication service 237 may evaluate a certificate revocation list (CRL) of the IoT service 117 to determine whether a serial number of the underlying digital certificate is listed in the CRL.

Once confirmation of the validity status of the digital certificate is received, the provisioning service 236 may modify a status field associated with the digital certificate to indicate that the digital certificate is active (or revoked, based on the OCSP response and/or CRL lookup). Further, if the digital certificate is valid, the IoT service 117 may generate and return a confirmation of the registration of the digital certificate.

If either the provisioning certificate or digital certificate are determined to be invalid (e.g., all digital certificates have already been vended for each provisioning certificate, the OCSP response indicates that the digital certificate is invalid, etc.), then the method 600 ends. The provisioning service 236 may return an error to the IoT device or the management console 105 in such cases. Otherwise, the provisioning service 236 associates the digital certificate with the IoT device. For example, in the case of a third-party digital certificate, the provisioning service 236 may store the digital certificate in a repository provided by the IoT data store 123 and link the digital certificate to the corresponding entry for the IoT device in the registry 230 (as part of a step in the provisioning workflow for registering the IoT device in the registry 230). Further, in the event that the provisioning service 236 vends digital certificates, the provisioning service 236 may send the pre-generated digital certificate to the IoT device, while also linking the digital certificate to the corresponding registry entry for the device. Further, the provisioning service 236 can increment a counter indicating a number of digital certificates issued (and/or provisioning certificates claimed).

If the digital certificate has not yet been generated, then at step 625, the provisioning service 236 formats a CSR including the device credentials (e.g., such public key provided by the IoT device) and sends the CSR to the CA 238. In some cases, the provisioning component 236 itself may generate the key pair on behalf of the IoT device. The CA 238 generates an X.509 digital certificate from the CSR. To do so, the CA 238 may verify the CSR against identification requirements (e.g., specified for the cloud computing platform 115), create a digital document (including the public key and other information, such as that provided in the device policy) corresponding to the certificate, and sign the digital certificate. At step 630, the CA 238 issues the digital certificate. The CA 238 may send the digital certificate to the provisioning service 236, which may forward the digital certificate to the IoT device. Further, the custom provisioning workflow may include steps for registering the IoT device with the registry 230. Further still, the provisioning service 236 may also associate the digital certificate with the IoT device (e.g., via the registry 230). Further, the provisioning service 236 may attach the policy to the generated IoT certificate. Attaching an IoT policy to the digital certificate gives the IoT device permissions specified in the policy.

Figure 7:
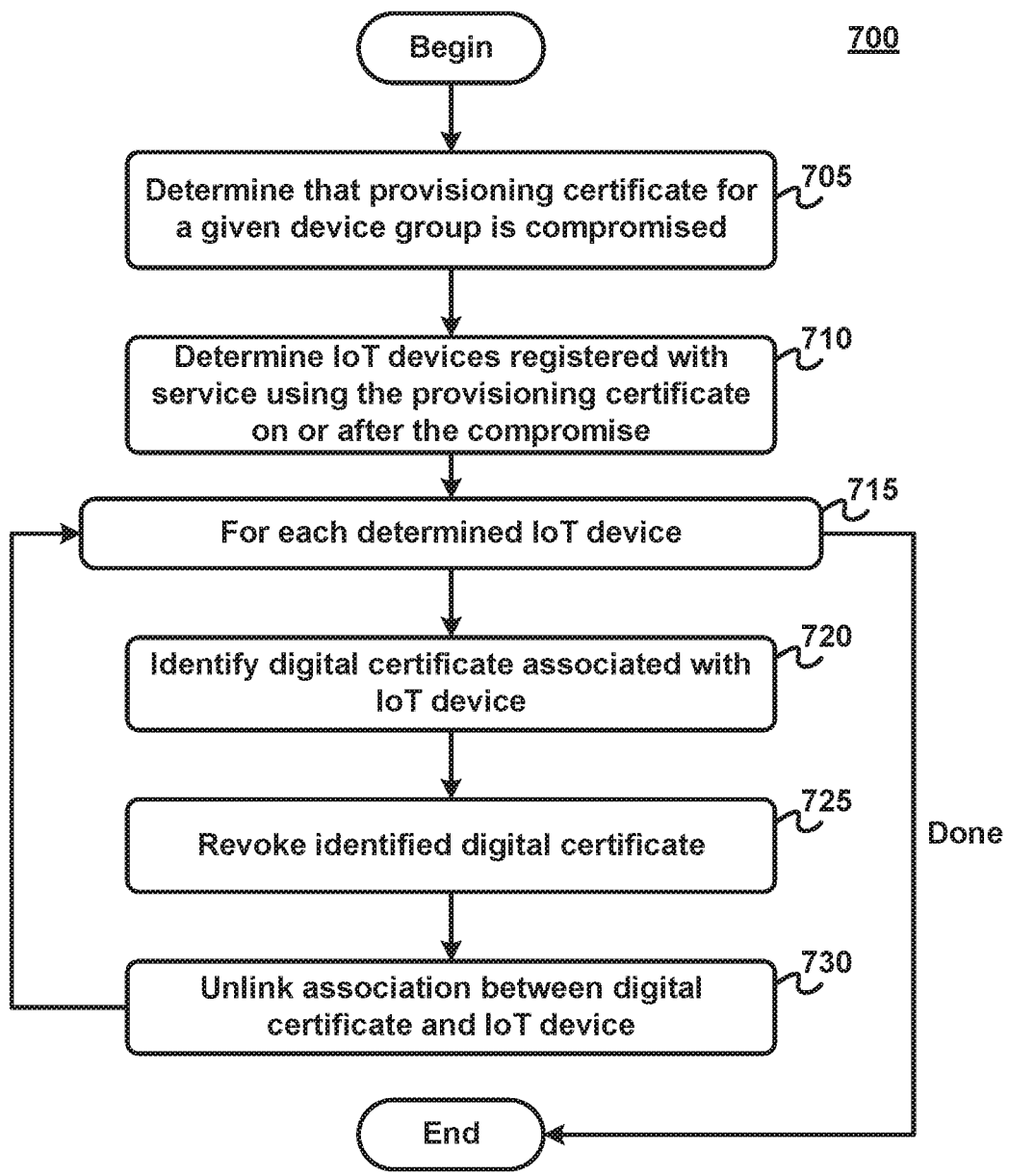
FIG. 7 illustrates a method for identifying a digital certificate associated with a compromised provisioning certificate associated with a device group, according to one embodiment.

FIG. 7 illustrates a method 700 for identifying a digital certificate associated with a compromised provisioning certificate associated with a device group, according to one embodiment. In some cases, a provisioning certificate may become compromised (e.g., an attacker may successfully spoof information provided in a provisioning certificate and receive a digital certificate based on that provisioning certificate). In such a case, it is necessary to identify IoT devices that may have been provisioned using the provisioning certificate. IoT devices provisioned on or after the date of compromise pose a security risk to the IoT service 117.

As shown, the method 700 begins at step 705, where the identity manager 235 determines that a given provisioning certificate for a device group has been compromised. For instance, the provisioning service 236 may detect a compromise of a provisioning certificate, for example, if a count of claimed provisioning certificates begins to exceed a number of expected claims. The IoT service 117 may also otherwise receive notifications of a compromise to the provisioning certificate (e.g., by the manufacturer of the IoT device, security officer or administrator of the cloud computing platform 115, etc.). The notification may include the provisioning certificate (or information provided in the provisioning certificate, e.g., manufacturer ID, device group ID, etc.).

At step 710, the identity manager 235 determines IoT devices that have been provisioned, in part, with the provisioning certificate on the date of or after the compromise. To do so, the identity manager 235 may query the registry 230 using identifying information provided by the provisioning certificate and timestamp data provided in the indication. In turn, the registry 230 returns a listing of the IoT devices provisioned using that provisioning certificate.

At step 715, the method 700 enters a loop between steps 720 and 730 for each of the IoT devices identified in the registry 230. At step 720, the identity manager 235 identifies a digital certificate associated with the IoT device. To do so, the identity manager 235 may again evaluate the listing returned by the registry to determine the digital certificate associated with IoT device. For example, the registry may provide information such as the serial number and issuing CA of the digital certificate. The provisioning service 236 may send the serial number and issuing CA information to the CA 238.

At step 725, the CA 238 revokes the identified digital certificate. To do so, the CA 238 may add the serial number of the digital certificate to a certificate revocation list (CRL) maintained by the CA 238. Doing so ensures that subsequent authentication attempts to the IoT service 117 using the digital certificate will fail.

At step 730, the provisioning service 236 unlinks the association between the identified digital certificate and the IoT device. The provisioning service 236 may modify the registry 230 to remove information regarding the digital certificate. In some cases, the identity manager 235 may generate an indication that the digital certificate has been revoked and publish the notification to the IoT device via the message broker service. The notification may also prompt the IoT device to verify its credentials with the identity manager 235 to continue using the IoT service 117 (and other services provided by the cloud computing platform 115). In one embodiment, the provisioning service 236 may schedule an over-the-air (OTA) update to the IoT device to provision a new digital certificate for the device. Doing so allows the IoT device to connect to the IoT service for further configuration of new credentials.

Figure 8:
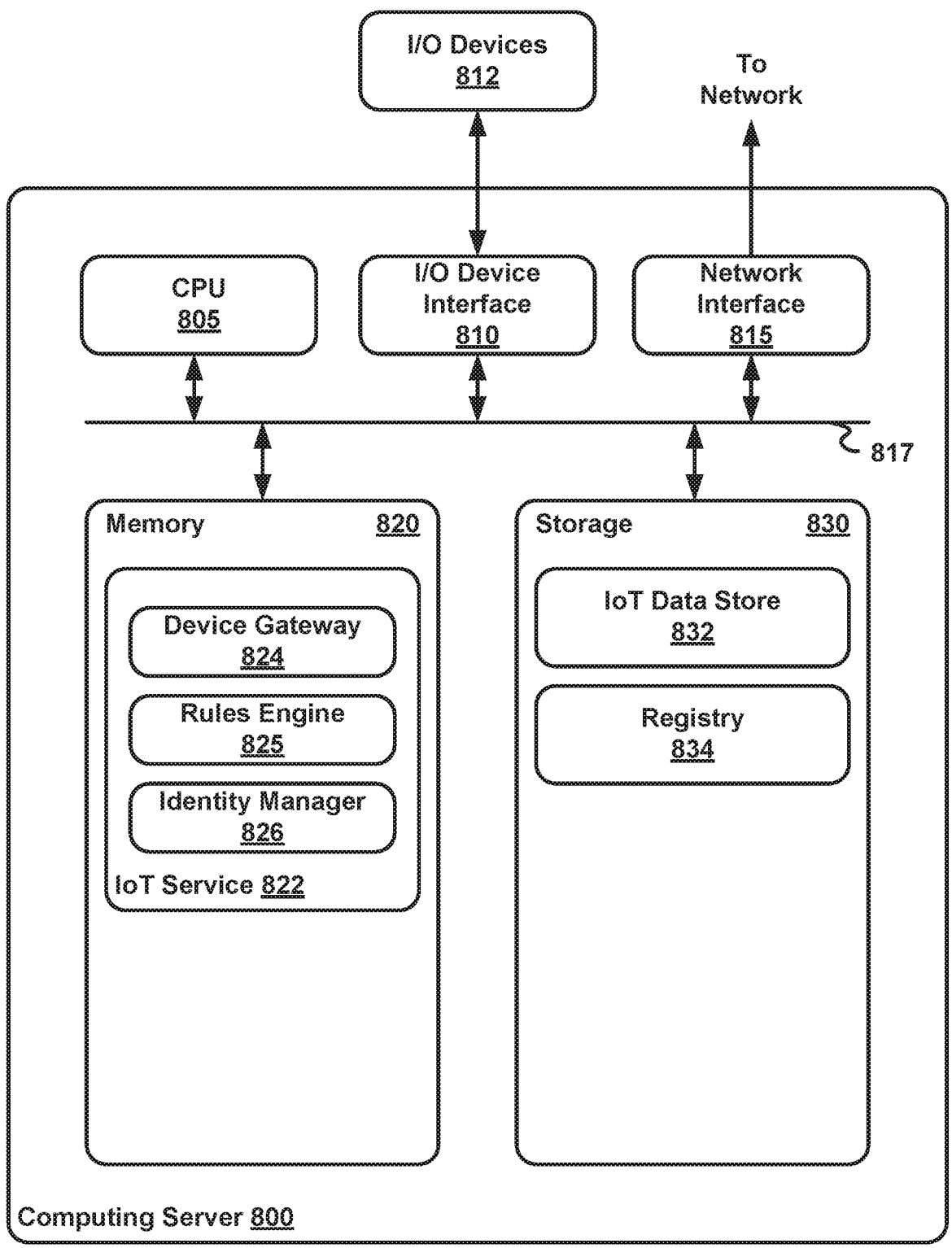
FIG. 8 illustrates an example computing server that hosts an IoT service used to provision IoT devices with device-specific credentials, according to one embodiment.

FIG. 8 illustrates an example computing server 800 that hosts an IoT service used to provision IoT devices with device-specific credentials, according to one embodiment.

As shown, the computing server 800 includes, without limitation, a central processing unit (CPU) 805, a network interface 815, a memory 820, and storage 830, each connected to an interconnect bus 817. The computing server 800 also includes an I/O device interface 810 connecting I/O devices 812 to the computing server 800.

In context of this disclosure, the components shown in computing server 800 correspond to both physical computing systems (e.g., a system in a data center) as well as components of a virtual machine (VM) instance executing within a computing cloud. Further, a cloud computing service provider could offer components of the IoT services accessed using a network browser or dedicated console application (e.g., console applications to configure IoT devices for use on the cloud computing service provider). Further still, while shown as running on a single computing server 800, components in memory 820 and storage 830 may be deployed across multiple computing servers.

CPU 805 retrieves programming instructions and application data stored in the memory 820 and storage 830. The interconnect bus 817 is used to transmit programming instructions and application data between the CPU 805, I/O device interface 810, network interface 815, memory 820, and storage 830. Note, CPU 805 is included to be representative of a single CPU, multiple CPUs, a single CPU having multiple processing cores, and the like, and the memory 820 is generally included to be representative of a random access memory. The storage 830 may be a disk drive or flash storage device. Although shown as a single unit, the storage 830 may be a combination of fixed and/or removable storage devices, such as fixed disc drives, removable memory cards, optical storage, network attached storage (NAS), or a storage area-network (SAN).

Illustratively, the memory 820 includes an IoT service 822. The storage 830 includes an IoT data store 832 and a registry 832. The IoT service 822 itself includes a device gateway 824, rules engine 825, and an identity manager 826. As described, the IoT service 822 is generally configured to allow connected IoT devices to interact with services provided by a cloud computing platform. For example, the device gateway 824 allows IoT devices to communicate with other connected devices and cloud services using a publish-subscribe-based message broker service. And the rules engine 825 evaluates inbound messages published to the IoT service 117 sent by the IoT devices against pre-defined rules.

In one embodiment, the identity manager 826 authenticates a previously uninitialized IoT device using data identifying the IoT device stored during manufacture of the device group as part of a provisioning certificate. In addition, the identity manager 826 may invoke user-defined workflows to further authenticate the IoT device (e.g., by evaluating additional identifying information associated with the device to perform multi-factor authentication).

Once authenticated, the identity manager 826 may provision device-specific credentials for the IoT device, such as an X.509 digital certificate. For example, the identity manager 826 may do so by invoking a user-defined provisioning workflow. Once the IoT device activates the digital certificate and reconnects to the IoT service 822, the identity manager 826 may register the IoT device with the registry 834, which provides information regarding IoT devices associated with a given user account.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium storing instructions, which, when executed on a processor, perform an operation comprising:
    receiving, from an Internet of Things (IoT) device, a request to provision the IoT device with device-specific credentials for accessing an IoT service, wherein the request comprises (i) a provisioning certificate for the IoT device that specifies one or more generic credentials associated with a plurality of IoT devices, which include the IoT device, and (ii) one or more additional credentials for the IoT device;
    performing, in response to the request, a first authentication procedure of the IoT device based on the one or more generic credentials specified in the provisioning certificate;
    upon determining the IoT device is successfully authenticated via the first authentication procedure, performing a second authentication procedure of the IoT device based on the one or more additional credentials for the IoT device, wherein the second authentication procedure is a custom authentication procedure defined by a user of the IoT service; and upon determining the IoT device is successfully authenticated via the second authentication procedure, provisioning the IoT device with the device-specific credentials.

2. The non-transitory computer-readable storage medium of claim 1, wherein performing the first authentication procedure comprises:

retrieving one or more registered credentials for the plurality of IoT devices from a database; and determining whether at least one of the one or more generic credentials specified in the provisioning certificate corresponds to at least one of the one or more registered credentials for the plurality of IoT devices retrieved from the database.

3. The non-transitory computer-readable storage medium of claim 1, wherein performing the first authentication procedure comprises determining whether an amount of provisioning certificates previously claimed for the plurality of IoT devices has been exceeded.

4. The non-transitory computer-readable storage medium of claim 1, wherein performing the second authentication procedure comprises performing multi-factor authentication based on the one or more additional credentials for the IoT device.

5. The non-transitory computer-readable storage medium of claim 4, wherein performing multi-factor authentication comprises verifying that at least one of the one or more additional credentials for the IoT device is associated with at least one of the one or more generic credentials specified in the provisioning certificate.

6. The non-transitory computer-readable storage medium of claim 1, wherein the one or more generic credentials comprises at least one of: an identifier of a manufacturer of the plurality of IoT devices, an identifier of a type of the plurality of IoT devices, a date of manufacture of the plurality of IoT devices, and an identifier of the plurality of IoT devices.

7. The non-transitory computer-readable storage medium of claim 1, wherein the one or more additional credentials comprises at least one of: a hardware identifier of the IoT device, a media access control (MAC) address of the IoT device, and geolocation information of the IoT device.

8. A system comprising:

one or more computer processors; and one or more memories storing instructions, which, when executed by the one or more computer processors, cause the one or more computer processors to perform an operation comprising:

receiving, from an Internet of Things (IoT) device, a request to provision the IoT device with device-specific credentials for accessing an IoT service;

performing, in response to the request, a first authentication procedure of the IoT device based on a provisioning certificate for the IoT device that specifies generic information associated with a plurality of IoT devices, which include the IoT device;

upon determining the IoT device is successfully authenticated via the first authentication procedure, performing a second authentication procedure of the IoT device based on additional information for the IoT device, wherein the second authentication procedure is a user-defined authentication procedure; and upon determining the IoT device is successfully authenticated via the second authentication procedure, provisioning the IoT device with the device-specific credentials.

9. The system of claim 8, wherein performing the first authentication procedure comprises:

retrieving registered information for the plurality of IoT devices from a database; and determining whether the generic information specified in the provisioning certificate corresponds to the registered information for the plurality of IoT devices retrieved from the database.

10. The system of claim 8, the operation further comprising:

identifying a user account associated with the IoT device, based on the additional information;

accessing the user account using credentials for the user account specified in the additional information;

retrieving a custom authentication workflow associated with the user account; and using the custom authentication workflow for the user-defined authentication procedure.

11. The system of claim 8, wherein performing the second authentication procedure comprises performing multi-factor authentication based on the additional information for the IoT device.

12. The system of claim 11, wherein performing multi-factor authentication comprises verifying that the additional information for the IoT device is consistent with the generic information specified in the provisioning certificate.

13. The system of claim 8, wherein performing the second authentication procedure comprises triggering the IoT device to transmit at least some of the additional information.

14. The system of claim 8, wherein the determination that the IoT device is successfully authenticated via the first authentication procedure triggers an event-driven computing service to invoke a function to retrieve and perform the second authentication procedure.

15. The system of claim 8, wherein the additional information comprises at least one of: a hardware identifier of the IoT device, a media access control (MAC) address of the IoT device, and a data source name (DSN) of the IoT device.

16. The system of claim 8, wherein the generic information comprises at least one of: an identifier of a manufacturer of the plurality of IoT devices, an identifier of a type of the plurality of IoT devices, a date of manufacture of the plurality of IoT devices, and an identifier of the plurality of IoT devices.

17. The system of claim 8, wherein the request comprises the provisioning certificate and the additional information.

18. A computer-implemented method comprising:

receiving, from an Internet of Things (IoT) device, a request to provision the IoT device with device-specific credentials for accessing an IoT service;

performing, in response to the request, a first authentication procedure of the IoT device based on a provisioning certificate for the IoT device that specifies generic information associated with a plurality of IoT devices, which include the IoT device;

upon determining the IoT device is successfully authenticated via the first authentication procedure, performing a second authentication procedure of the IoT device based on additional information for the IoT device, wherein the second authentication procedure is a user-defined authentication procedure; and upon determining the IoT device is successfully authenticated via the second authentication procedure, provisioning the IoT device with the device-specific credentials.

19. The computer-implemented method of claim 18, wherein performing the first authentication procedure comprises:
retrieving registered information for the plurality of IoT devices from a database; and
determining whether the generic information specified in the provisioning certificate corresponds to the registered information for the plurality of IoT devices retrieved from the database.

20. The computer-implemented method of claim 18, wherein performing the second authentication procedure comprises performing multi-factor authentication based on the additional information for the IoT device.

* * * * *

UNITED STATES PATENT AND TRADEMARK OFFICE
CERTIFICATE OF CORRECTION

PATENT NO. : 11,128,612 B1
APPLICATION NO. : 16/582653
DATED : September 21, 2021
INVENTOR(S) : Rameez Loladia et al.

Page 1 of 1

It is certified that error appears in the above-identified patent and that said Letters Patent is hereby corrected as shown below:

On the Title Page

In item (54), in Column 1, in "Title", Line 2, delete "MULTI FACTOR" and insert
-- MULTI-FACTOR --.

In the Specification

In Column 1, Line 2, delete "MULTI FACTOR" and insert -- MULTI-FACTOR --.

In Column 13, Line 7, delete "OSCP" and insert -- OCSP --.

Signed and Sealed this
Twenty-fourth Day of January, 2023

Katherine Kelly Vidal
*Director of the United States Patent and Trademark Office*